J. Packer,
Chain Link,
№ 39,239. Patented July 14, 1863.

Witnesses:
M. S. Partridge
Daniel Robertson

Inventor:
James Packer

UNITED STATES PATENT OFFICE.

JAMES PACKER, OF NEW YORK, N. Y.

IMPROVED CHAIN-LINK.

Specification forming part of Letters Patent No. 39,239, dated July 14, 1863.

*To all whom it may concern:*

Be it known that I, JAMES PACKER, of the city, county, and State of New York, have invented a new and Improved Chain-Link; and I do hereby declare that the following is a full, clear, and exact description of the same, reference being had to the accompanying drawings, forming a part of this specification, in which—

Figure 1:
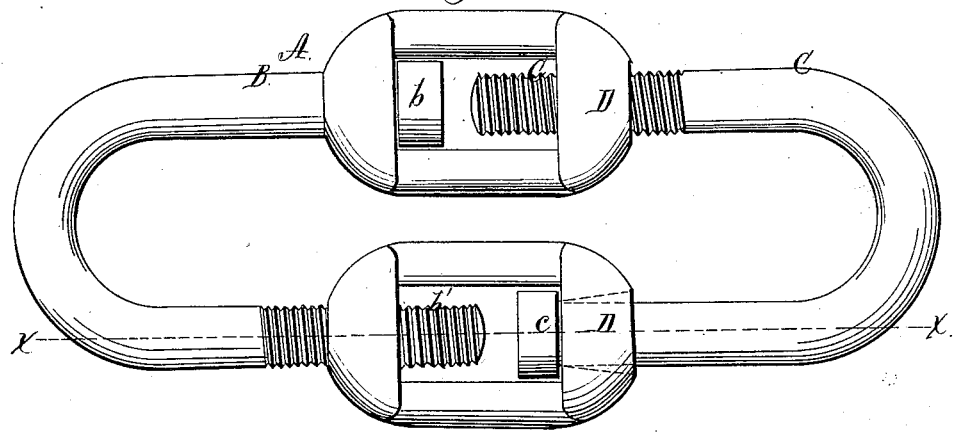
Figure 2:
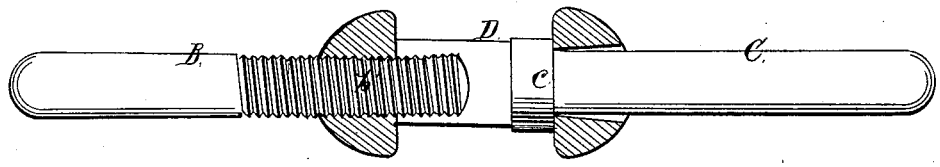

Figure 1 represents a face view of my invention. Fig. 2 is a longitudinal vertical section of the same, the line $x\ x$, Fig. 1, indicating the plane of section.

Similar letters of reference in both views indicate corresponding parts.

The object of this invention is an improvement on the chain-link for which a patent has been granted to G. W. W. Yost, September 11, 1860, and which is intended to be used for the purpose of connecting two ordinary links of a chain in case one of the links should break.

My invention consists in a link made of two distinct parts, which are united by two swivels which screw on the ends of the two parts of the link in such a manner that in case an ordinary link of a chain breaks, while the same is stretched and in use, one part of my link can be slipped into one, and the other part into the other, link adjoining the broken link of the chain, and by drawing the two parts of my link together the chain is restored without slacking it or taking off the strain to which the same had been subjected previous to the parting of the link.

To enable others skilled in the art to fully comprehend and construct my invention, I will proceed to describe it.

A represents a link made of two parts, B C, which are bent, as clearly shown in Fig. 1 of the drawings. Each part is provided with a head, $b\ c$, on one, and with a screw-thread, $b'\ c'$, on the other end, and the two parts are united by swivels D, one end of which catches over the heads $b\ c$, while their other ends form the female screws to fit to the screw-threads $b'\ c'$. Instead of the heads $b\ c$, both ends of each part B C might be provided with a screw-thread—one right-handed and the other left-handed—to fit into corresponding female threads in both ends of the swivels, so that by turning the swivels in one direction the two parts of the link separate, and by turning the swivels in the opposite direction the two parts are drawn up together. If a link of an ordinary chain breaks, the swivels D are unscrewed, so that the two parts B C can be separated, and the end $b'$ of the part B is slipped into one of the links adjoining the broken link, and the end $c'$ of the part C into the other, and the swivels D are now screwed on again. The two parts B C are thereby drawn together, and the chain is restored and can be used the same as before the link parted. It remains to remark that the swivels D can be made of malleable or of wrought-iron, and their shape must be such that they form no obstruction to the passage of the chain through a hawse-hole or other narrow passage, and that they are not liable to catch at any place with which they may come in contact.

What I claim as new, and desire to secure by Letters Patent, is—

A chain-link, A, made of two parts, B C, united by two swivels, D, in the manner and for the purpose substantially as shown and described.

JAMES PACKER.

Witnesses:
 M. S. PARTRIDGE,
 DANIEL ROBERTSON.